(12) United States Patent
Zhang et al.

(10) Patent No.: US 11,675,187 B2
(45) Date of Patent: Jun. 13, 2023

(54) METHOD FOR DESIGNING IMAGING OPTICAL SYSTEM

(71) Applicants: Tsinghua University, Beijing (CN); HON HAI PRECISION INDUSTRY CO., LTD., New Taipei (TW)

(72) Inventors: Ben-Qi Zhang, Beijing (CN); Jun Zhu, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 247 days.

(21) Appl. No.: 17/233,825

(22) Filed: Apr. 19, 2021

(65) Prior Publication Data

US 2022/0229289 A1    Jul. 21, 2022

(30) Foreign Application Priority Data

Jan. 15, 2021 (CN) .......................... 202110057067.9

(51) Int. Cl.
*G02B 27/00* (2006.01)
*G02B 5/10* (2006.01)

(52) U.S. Cl.
CPC .......... *G02B 27/0012* (2013.01); *G02B 5/10* (2013.01)

(58) Field of Classification Search
CPC .. G02B 5/10; G02B 17/0636; G02B 17/0642; G20B 27/0012
USPC .......................... 359/366, 731, 859, 861, 868
See application file for complete search history.

(56) References Cited

U.S. PATENT DOCUMENTS

| | | | | |
|---|---|---|---|---|
| 9,268,123 B2* | 2/2016 | Zhu | .................... | G02B 17/0642 |
| 9,524,565 B2* | 12/2016 | Zhu | .................... | G02B 27/0012 |
| 10,197,799 B2* | 2/2019 | Hou | .................... | G02B 27/0012 |
| 10,386,619 B2* | 8/2019 | Zhu | .................... | G02B 17/0642 |
| 10,495,875 B2* | 12/2019 | Hou | .................... | G02B 17/0626 |
| 10,962,413 B2* | 3/2021 | Zhu | .......................... | G01J 3/18 |
| 11,169,024 B2* | 11/2021 | Rolland-Thompson | ..................... | G01J 3/021 |
| 11,221,471 B2* | 1/2022 | Zhang | ................ | G02B 17/0642 |
| 11,371,889 B2* | 6/2022 | Wu | ........................ | G01J 5/0846 |
| 11,448,865 B2* | 9/2022 | Zhu | .................... | G02B 17/0642 |
| 2015/0253552 A1* | 9/2015 | Zhu | ........................ | G01J 1/0414 250/216 |
| 2015/0253554 A1* | 9/2015 | Yang | ........................ | G06F 30/00 703/1 |

(Continued)

FOREIGN PATENT DOCUMENTS

CN    108241207    7/2018

*Primary Examiner* — Ricky D Shafer
(74) *Attorney, Agent, or Firm* — ScienBiziP, P.C.

(57) ABSTRACT

A method for designing an imaging optical system is a point-by-point calculation method based on characteristic light rays (FLR) and characteristic data points (FDP). The basic function of the point-by-point calculation method includes the following steps: according to the given object-image relationship, based on Fermat's principle and the law of retraction and reflection, calculating the propagation path of the FLR passing through a system and the FDP on each optical surface, to obtain a surface shape equation of each optical surface by fitting; and repeating the above process, to solve the surface shape equation of each optical surface one by one, and finally complete the design and solution of the entire imaging optical system.

10 Claims, 16 Drawing Sheets

100

(56) References Cited

U.S. PATENT DOCUMENTS

2018/0180877 A1   6/2018   Hou et al.
2018/0210981 A1*  7/2018   Zhu .......................... G02B 5/10

* cited by examiner

300

METHOD FOR DESIGNING IMAGING OPTICAL SYSTEM

CROSS-REFERENCE TO RELATED APPLICATIONS

This application is related to commonly-assigned application entitled, "IMAGING OPTICAL SYSTEM", U.S. patent application Ser. No. 17/233,833, concurrently filed on Apr 19, 2021. The entire contents of which are incorporated herein by reference.

FIELD

The present application relates to a field of optical design, and in particular to a method for designing an imaging optical system.

BACKGROUND

The imaging optical system is an important tool for humans to observe and record nature. The focal length and the field of view are two important indicators of the imaging optical system. The field of view reflects the imaging range of the imaging optical system, and the focal length reflects the resolution rate of the imaging optical system. If the full field of view of the imaging optical system is $2\omega$, the image height H and focal length f of the imaging optical system satisfy formula: $H=2f \tan \omega$. When the focal length is fixed, the larger the field of view, the larger the range of observations, but the resolution of the imaging optical system will not increase. When the field of view is fixed, the longer the focal length and the larger the image, the resolution rate of the imaging optical system will increase. When the size of the image is fixed, the larger the focal length and the smaller the field of view, the resolution rate of the imaging optical system will increase, but the range of observable objects will decrease. The formula $H=2f \tan \omega$ shows when the size of the image surface remains unchanged, the focal length f and the field of view co of the imaging optical system cannot be increased at the same time. Therefore, it is difficult to obtain an imaging optical system with a larger field of view and a higher resolution rate at the same time.

Therefore, there is room for improvement in the art.

BRIEF DESCRIPTION OF THE DRAWINGS

Implementations of the present technology will now be described, by way of embodiments, with reference to the attached figures, wherein.

DETAILED DESCRIPTION

Figure 1:
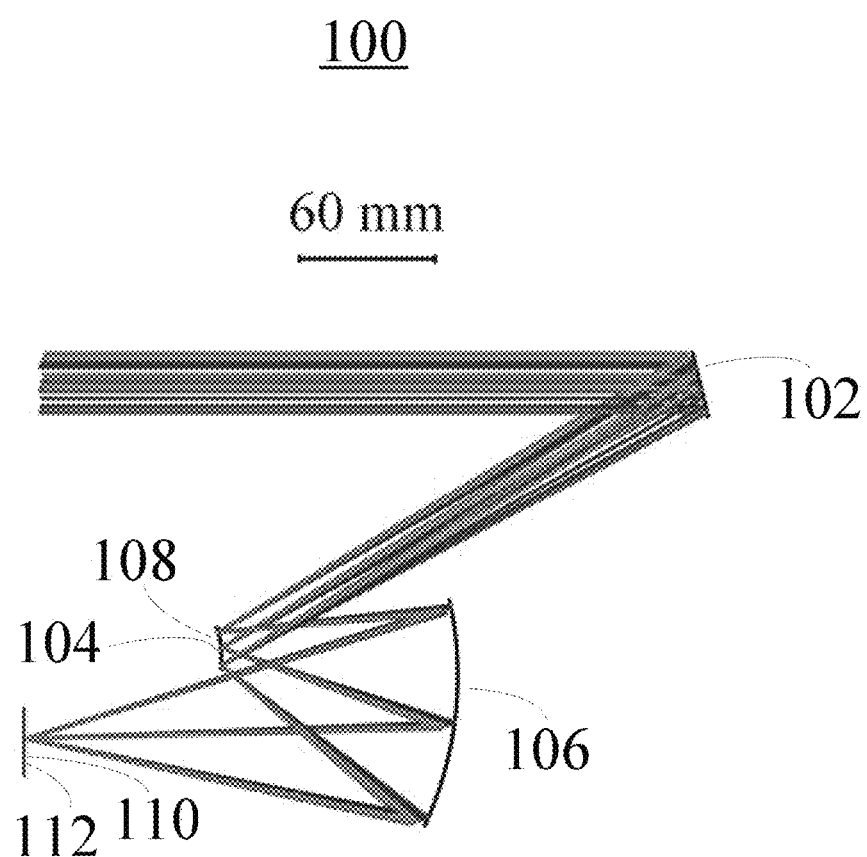
FIG. 1 shows a schematic side view of an optical path of an imaging optical system of a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to illustrate details and features better. The description is not to be considered as limiting the scope of the embodiments described herein.

Several definitions that apply throughout this disclosure will now be presented.

The term "substantially" is defined to be essentially conforming to the particular dimension, shape or another word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 2:
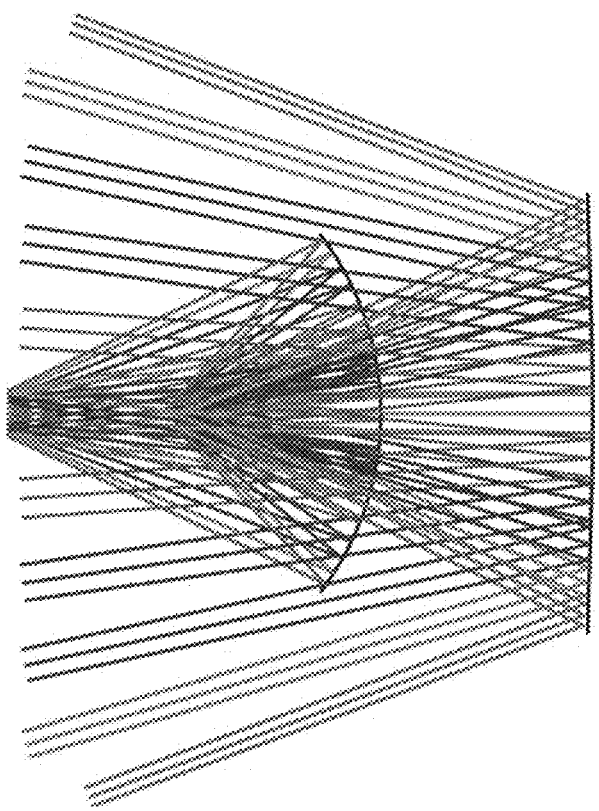
FIG. 2 shows a schematic top view of the optical path of the imaging optical system of the first embodiment.

Referring to FIG. 1 and FIG. 2, an imaging optical system 100 of a first embodiment includes a primary reflecting mirror 102, a secondary reflecting mirror 104, a tertiary reflecting mirror 106 and an aperture stop (AS) 108. The aperture stop 108 is located on the secondary reflecting mirror 104. The light from the object enters the primary reflecting mirror 102 and is reflected on the primary reflecting mirror 102, to form a first reflected light beam. The first reflected light beam irradiates the secondary reflecting mirror 104 and is reflected, to form a second reflected light beam. The second reflected light beam irradiates the tertiary reflecting mirror 106 and is reflected, to form a third reflected light beam, and the third reflected light beam reaches an image surface 110 for imaging.

The shape of the aperture stop 108 is not limited. In one embodiment, the aperture stop 108 is circular, and the outer edge of the aperture stop 108 coincides with the outer edge of the secondary reflecting mirror 104.

The image surface 110 and the primary reflecting mirror 102 are located on both sides of the secondary reflecting mirror 104, respectively. The secondary reflecting mirror 104 is between the image surface 110 and the primary reflecting mirror 102. The image surface 110 and the primary reflecting mirror 102 are also located on two opposite of the tertiary reflecting mirror 106, respectively. The tertiary reflecting mirror 106 is between the image surface 110 and the primary reflecting mirror 102.

The imaging optical system 100 further includes a detector 112 located at the image surface 110 and used for recording information on the image surface 110. The detector 112 may also be a photographic film or the like.

The imaging optical system 100 has a field of view, a focal length of the field of view that is defined as FFL, an effective aperture of a field of view entrance pupil that is defined as FEPD, and a field of view F-number that is defined as FFN.

The focal length of the field of view (FFL) is the focal length of each field of view of the imaging optical system 100. A field of view of the imaging optical system 100 is defined as $\omega$, the field of view adjacent to $\omega$ is defined as $\omega'$, and the angle between the field of view $\omega$ and the field of view $\omega'$ is defined as $\Delta\omega$. The distance between the image points corresponding to the field of view w and the field of view $\omega'$ is defined as $\Delta h$, and the FFL of the field of view $\omega$ satisfies formula:

$$FFL(\omega, \Delta\omega) = \frac{\Delta h}{\Delta\omega},$$

wherein $\Delta\omega=\omega'-\omega$, which is used to represent the relative positional relationship between the field of view $\omega'$ and the field of view $\omega$.

Figure 3:
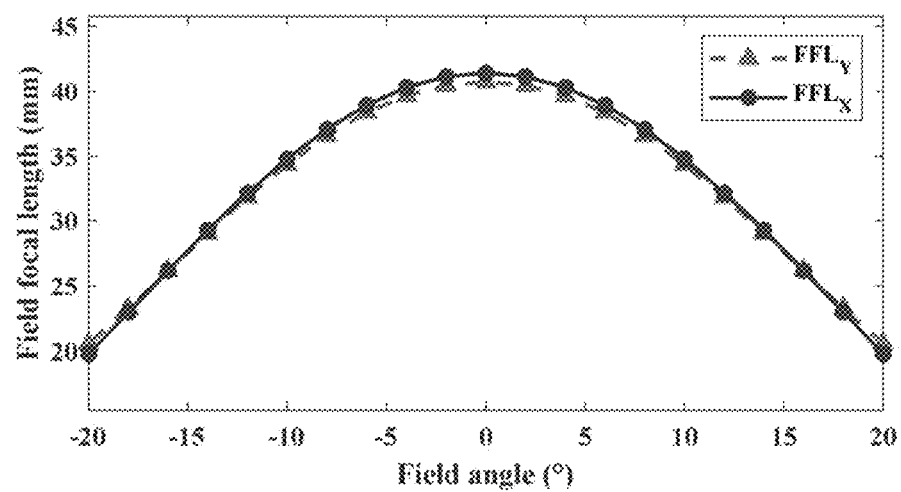
FIG. 3 shows a curve of a FFL of the imaging optical system varied with the field of view of the first embodiment.

The FFL continuously changes as the field angle changes. The FFL at the center of the field of view is larger than the FFL at the edges of the field of view. In one embodiment, the FFL at the center of the field of view is twice the FFL at the edges of the field of view FIG. 3 shows a curve of the FFL varied with the field of view. It can be seen from FIG. 3 that the FEL changes continuously with the change of the field of view. The FFL at the center of the field of view is 40 mm (millimeters), wherein the field angle of the center of the field of view is 0 degrees. The FFL at the edges of the field of view is 20 mm, wherein the field angles of the edges of the field of view are −20 degrees and 20 degrees. Thus, the FFL at the center of the field of view is twice the FFL at the edges of the field of view. The ratio of the FFL of the central field of view to the FFL of the edge field of view reflects the degree of improvement in the performance of the imaging optical system 100. The larger the ratio, the more the overall performance of the imaging optical system 100 is improved.

In an imaging system, the position and size of the entrance pupil in different fields of view are different. The parameter describing this local optical characteristic is called the field of view entrance pupil that is defined as FENP. The FENP is projected onto a plane perpendicular to the chief ray of the field of view. This projection is called the effective aperture of the FENP, which is the effective aperture of the field of view entrance pupil (FEPD). For the field of view $\omega$, the shape and size of the FEPD can be described by the function R ($\omega$, $\varphi$), wherein $\omega$ represents the polar coordinate angle of the aperture. If the FENP is a circle, the size of R ($\omega$, $\varphi$) has nothing to do with $\varphi$. The diameter of the effective aperture of FENP in different polar coordinate angle directions satisfies formula:

$$FEPD(\Psi, \varphi) = R(e\omega\varphi) + R(\omega, 180°-\varphi)$$

In particular, when $\varphi=0$ and $\Psi=90°$, the FEPD satisfies formula:

$$FEPD_x(\omega) = FEPD\ (\omega,\ \varphi=0),\quad FEPD_Y(\omega) = FEPD\ (\omega, \varphi=90°).$$

Figure 4:
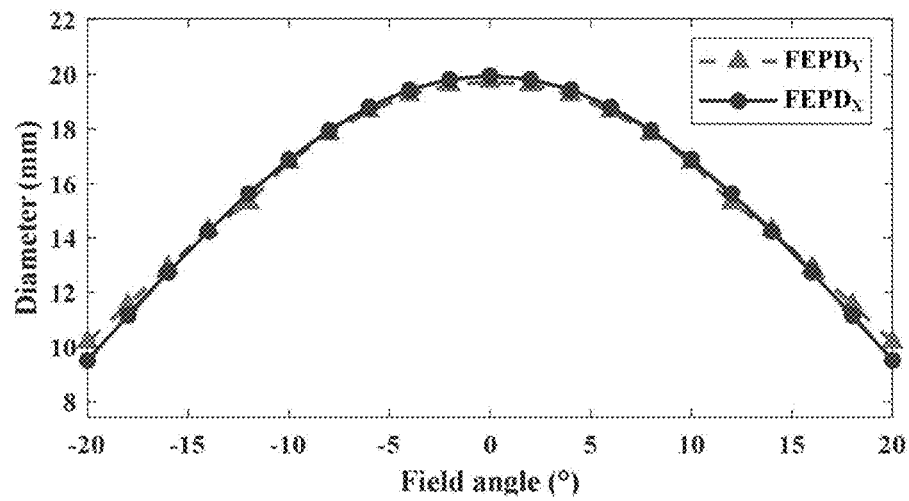
FIG. 4 shows a curve of a FEPD of the imaging optical system varied with the field of view of the first embodiment.

The FEPD changes continuously as the field angle changes. The FEPD at the center of the field of view is larger than the FEPD at the edges of the field of view. In one embodiment, the FEPD at the center of the field of view is twice the FEPD at the edge of the field of view. FIG. 4 is a cu of the FEPD varied with the field of view. It can be seen from FIG. 4 that the FEPD changes continuously with the change of the field of view. The FEPD at the center of the field of view is 20 mm, wherein the field angle of the center of the field of view is 0 degrees. The FEPD at the edges of the field of view is 10 mm, wherein the field angles of the edges of the field of view are −20 degrees and 20 degrees. Thus, the FEPD at the center of the field of view is twice the FEPD at the edges of the field of view. The F-number of the field of view (FFN) is defined as:.

$$FFN(\omega, \Delta\omega) = \frac{FFL(\omega, \Delta\omega)}{FEPD(\omega, \varphi)},\ \Delta\omega = |\Delta\omega|\ \exp\ (i\varphi).$$

In particular, when $\omega=0$ and $\omega=90°$, the FFN satisfies formula:

$$FFN_X(\omega) = \frac{FFL_X(\omega)}{FEPD_X(\omega)},\ FFN_Y(\omega) = \frac{FFL_Y(\omega)}{FEPD_Y(\omega)}.$$

Since FFN=FFL/FEPD, and the FFN is equal to the ratio of the FFL to the FEPD, the FFN can change with the change of the field of view, or the FFN can be substantially unchanged with the change of the field of view. In one embodiment, the FFL and the FEPD continuously change, the FFL at the center of the field of view is twice the FFL at the edges of the field of view, and the FEPD at the center of the field of view is twice the FEPD at the edges of the field of view; FFN does not change with the field of view; and the resolution of the center field of view is twice that of the edges field of view. The parameters of the imaging optical system 100 are shown in Table 1.

TABLE 1

| Parameters of the imaging optical system 100 | |
|---|---|
| parameter | value |
| field of view | −20° ≤ $\omega_x$ ≤ 20°, $\omega_y = 0$ |
| $FFL_X$ (mm) | 20~40 |
| $FEPD_X$ (mm) | 10~20 |

TABLE 1-continued

Parameters of the imaging optical system 100

| parameter | value |
|---|---|
| $FFN_X$ (mm) | 2 |
| $FEPD_Y$ (mm) | 20 |

Table 2 shows the parameters of the imaging optical system 100 in one embodiment, the parameters includes the values of FFL, FEPD, and FEN in an X direction and a Y direction. It can also be seen from table 2 that the FFL at the center of the field of view is twice the FFL at the edges of the field of view, the FEPD at the center of the field of view is twice the FEPD at the edges of the field of view, and the FFN is substantially unchanged with the change of the field of view.

TABLE 2

Parameters of the imaging optical system 100

| Field of view (°) | 0 | 4 | 8 | 12 | 16 | 20 |
|---|---|---|---|---|---|---|
| $FFL_X$ (mm) | 41.41 | 40.30 | 37.09 | 32.18 | 76.18 | 19.77 |
| $FEPD_X$ (mm) | 19.95 | 19.44 | 17.95 | 15.64 | 12.74 | 9.52 |
| $FFN_X$ | 2.08 | 2.07 | 2.07 | 2.06 | 2.06 | 7.08 |
| $FFL_Y$ (mm) | 40.72 | 39.67 | 36.59 | 31.83 | 26.16 | 20.54 |
| $FEPD_Y$ (mm) | 19.73 | 19.26 | 17.83 | 15.8 | 12.92 | 10.19 |
| $FFN_Y$ | 2.06 | 7.06 | 2.05 | 7.08 | 2.07 | 2.02 |

Figure 5:
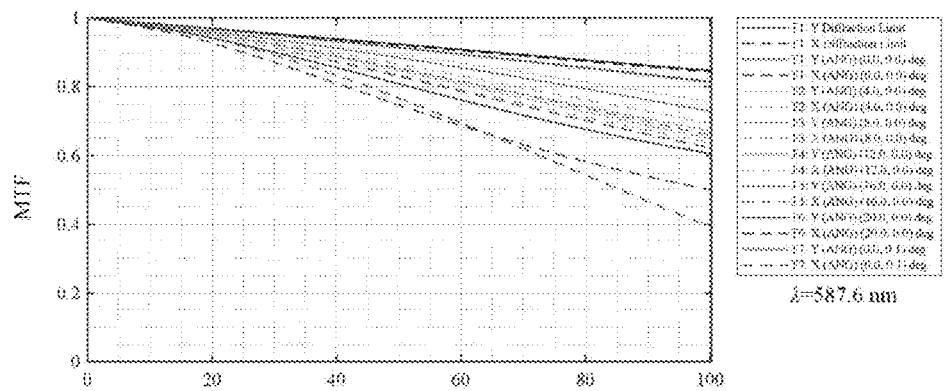
FIG. 5 shows a modulation transfer function (MTF) curve of the imaging optical system of the first embodiment.

FIG. 5 is a modulation transfer function (MTF) curve of the imaging optical system 100. It can be seen from FIG. 5 that the MIT curve of each field of view is close to the diffraction limit, indicating that the imaging optical system 100 has good imaging quality.

In the FIG. 3 to FIG. 5, Table 1, Table 2 and the above formulas, $FFL_X$ refers to the FFL value in the X direction, and $FFL_Y$ refers to the FFL value in the Y direction; $FED_X$ refers to the FEPD value in the X direction, and $FEPD_Y$ refers to the FEPD value in the Y direction; and $FFN_X$ refers to the FEN value in the X direction, and $FFN_Y$ refers to the FEN value in the Y direction.

The primary reflecting mirror 102, the secondary reflecting mirror 104, and the tertiary reflecting mirror 106 include but are not limited to a freeform surface reflecting mirror, a spherical reflecting mirror, or a hybrid surface reflecting mirror. In one embodiment, the primary reflecting mirror 102, the secondary reflecting mirror 104, and the tertiary reflecting mirror 106 are freeform surface reflecting mirrors, and the imaging optical system 100 is a freeform surface off-axis three-reflecting mirror optical system.

The freeform surface shapes of the primary minor 102, the secondary reflecting mirror 104, and the tertiary reflecting mirror 106 are described by XY polynomial curved surfaces in their respective local coordinate systems. The XY polynomial curved surface is a freeform surface, and the general equation of the XY polynomial curved surface in the local coordinate system satisfies formula:

$$z(x, y) = \frac{c(x^2 + y^2)}{1 + \sqrt{1 - (1+k)c^2(x^2 + y^2)}} + \sum_{i=1}^{N} A_i x^m y^n,$$

wherein z represents the vector height of the curved surface, c represents the curvature of the curved surface, k represents the quadric curved surface coefficient, and Ai represents the coefficient of ith term in the polynomial. The primary reflecting mirror 102, the secondary reflecting mirror 104, and the tertiary reflecting mirror 106 are described by a sixth-order XY polynomial containing only even-numbered terms about x. The surface shape parameters of the primary reflecting mirror 102, the secondary reflecting mirror 104, and the tertiary reflecting mirror 106 are shown in Table3.

TABLE 3

Surface shape parameters of the primary reflecting mirror 102, secondary reflecting mirror 104 and tertiary reflecting mirror 106

| parameter | primary reflecting mirror 102 | secondary reflecting mirror 104 | tertiary reflecting mirror 106 |
|---|---|---|---|
| c | 1/9.2E+03 | 1/7.3E+01 | 1/−1.1E+02 |
| k | 2.5E+03 | 3.1E+00 | −4.6E−01 |
| A2 | −3.4E+00 | −1.8E−01 | 2.4E−02 |
| A3 | −2.0E−03 | −2.0E−02 | 1.0E−03 |
| A5 | −2.2E−02 | −2.0E−02 | 1.0E−03 |
| A7 | −6.2E−05 | −1.3E−04 | 1.8E−08 |
| A9 | 9.6E−08 | −2.3E−04 | −7.3E−07 |
| A10 | 2.9E−08 | −3.8E−06 | 9.4E−09 |
| A12 | −8.1E−07 | −9.6E−06 | 1.7E−08 |
| A14 | 8.0E−07 | −1.2E−05 | 7.7E−09 |
| A16 | 4.0E−10 | −6.2E−08 | −1.7E−12 |
| A18 | −4.3E−09 | −3.4E−07 | −2.0E−11 |
| A20 | 3.9E−09 | −6.3E−07 | 1.1E−11 |
| A21 | 7.3E−14 | −4.7E−09 | 1.6E−13 |
| A23 | 1.6E−12 | −1.2E−08 | 3.3E−13 |
| A25 | −8.2E−12 | −2.7E−08 | 5.8E−13 |
| A27 | 5.8E−12 | −3.8E−08 | 3.1E−13 |

In one embodiment, aging optical system 100 is a line-of-view imaging system, the FFL, and the FEPD in the center field of view are twice that of the edges field of view, but the FEN of full field of view remains unchanged; the full field of view is 40°, the FFL of the central field of view is 40 mm, the FEPD of the central field of view is 20 mm, the FFL of the edge field of view is 20 mm, and the FEPD of the edge field of view is 10 mm; the total image height in the line-of-view imaging system is 23.28 mm, and the focal length of the field of view of the line-of-view imaging system is in a range from 20 mm to 40 mm. However, in an ordinary system with a 40° field of view; the focal length is only 31.98 mm. in an ordinary system with a focal length of 40 mm, the field of view is only 32°. Thus, the imaging optical system 100 has a larger field of view, a larger focal length, and a larger resolution than ordinary systems.

The imaging optical system 100 has the following advantages: first, the FFL and FEPD at central field of view are twice that of the edge field of views, and the resolution of the center field of view is twice that of the edge field of views, and the FFN of full field of view remains unchanged, thus the imaging optical system 100 has good imaging quality; second, because FFL and FEPD at the central field of view are larger than that at the edge field of view, the imaging optical system 100 can simultaneously have a larger field of view, a larger focal length, and a larger resolution.

The second embodiment of the present invention provides a design method of the imaging optical system 100. The design method of the imaging optical system 100 is a point-by-point calculation method based on characteristic light rays (RR) and characteristic data points (FDP). The FLR of one field of view refers to a series of rays belonging to the field of view and at different apertures. The FDP on an optical surface refers to a series of intersection points between the FLR of each field of view and the optical surface, and the FDP contains information on both coordinates and normal directions. The basic function of the point-by-point calculation method includes the following steps: according to the given object-image relationship, based on Fermat's principle and the law of refraction and reflection, calculating the propagation path of the FUR passing through the system and the FDP on each optical surface, to obtain a surface shape equation of each optical surface by fitting; repeating the above process, to solve the surface shape equation of each optical surface one by one, and finally complete the design and solution of the entire imaging optical system 100. Then, the imaging optical system 100 is obtained by processing.

The following descriptions of the various systems and parameters involved in the design method of the imaging optical system 100 with a specific FFL and a specific FEPD are all in a global coordinate system o-xyz.

Figure 6:
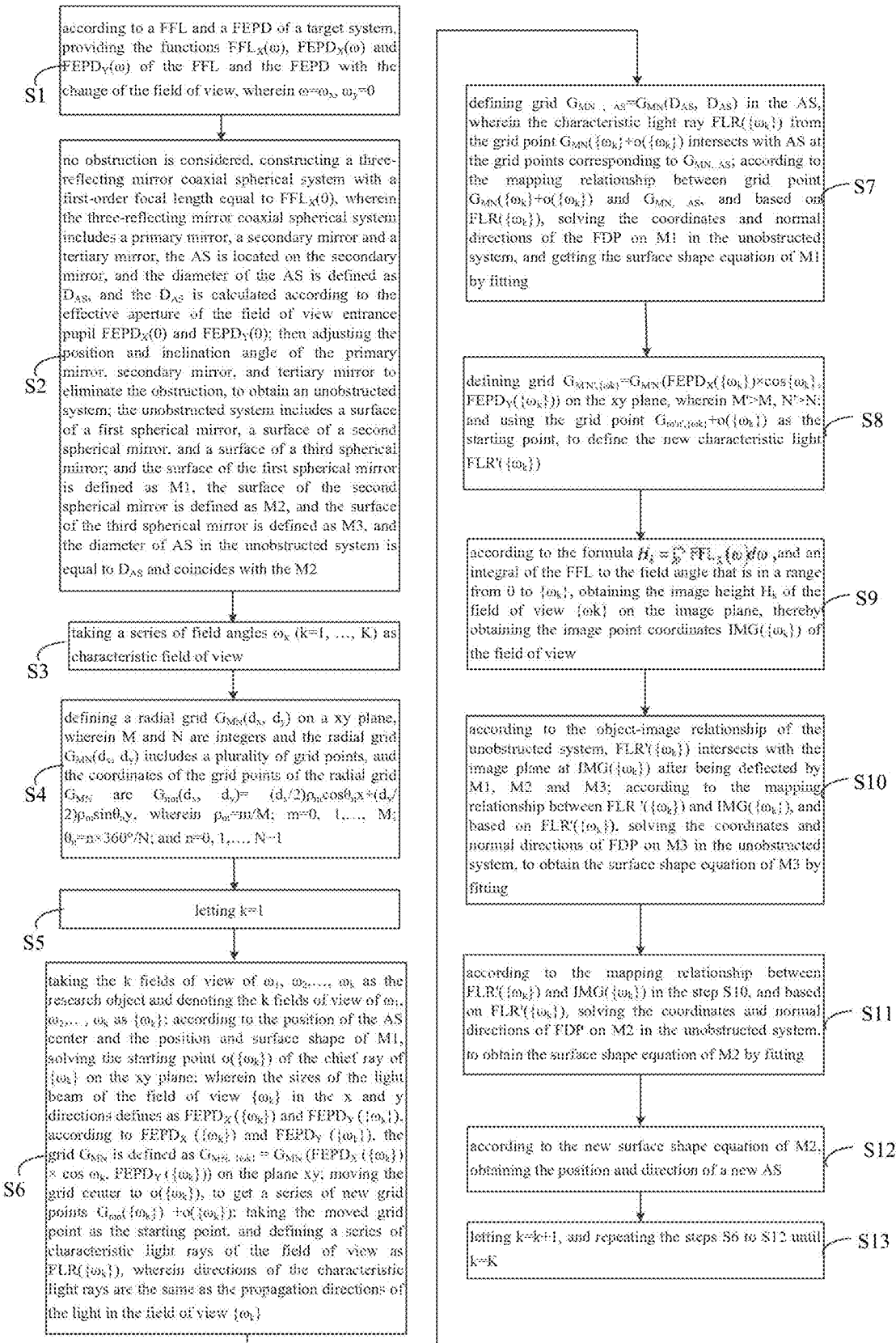
FIG. 6 shows a process flow of a method for designing the imaging optical system of a second embodiment.

Referring to FIG. 6, the method for designing the imaging optical system 100 includes the following steps:

S1, according to a FFL and a FEPD of a target system, providing the functions $FFL_X(\omega)$, $FEPD_X(\omega)$ and $FEPD_Y(\omega)$ of the FFL and the FEPD with the change of the field of view, wherein $\omega=\omega_x$, $\omega_y=0$;

S2, no obstruction is considered, constructing a three-reflecting mirror coaxial spherical system with a first-order focal length equal to $FFL_X(0)$, wherein the three-reflecting mirror coaxial spherical system includes a primary mirror, a secondary mirror and a tertiary mirror, the AS is located on the secondary mirror, and the diameter of the AS is defined as $D_{AS}$, and the $D_{AS}$ is calculated according to the effective aperture of the field of view entrance pupil $FEPD_X(0)$ and $FEPD_Y(0)$; then adjusting the position and inclination angle of the mirror, secondary mirror, and tertiary mirror to eliminate the obstruction, to obtain an unobstructed system; the unobstructed system includes a surface of a first spherical mirror, a surface of a second spherical mirror, and a surface of a third spherical mirror; and the surface of the first spherical mirror is defined as M1, the surface of the second spherical mirror is defined as M2, and the surface of the third spherical mirror is defined as M3, and the diameter of AS in the unobstructed system is equal to $D_{AS}$ and coincides with the M2;

S3, taking a series of field angles $\omega_k (k=1, \ldots, K)$ as characteristic field of view;

S4, defining a radial grid $G_{MN}(d_x, d_y)$ on a xy plane, wherein M and N are integers and the radial grid $G_{MN}(d_x, d_y)$ includes a plurality of grid points, and the coordinates of the grid points of the radial grid $G_{MN}$ are $G_{mn}(d_x, d_y)=(d_x/2)\rho_m\cos\theta_n x+(d_y/2)\rho_m\sin\theta_n y$, wherein $\rho_m=m/M$; $m=0, 1, \ldots, M$; $\theta_n=n\times 360°/N$; and $n=0, 1, \ldots, N-1$;

S5, letting k=1;

S6, taking the k fields of view of $\omega_1, \omega_2, \ldots \omega_k$ as the research object and denoting the k fields of view of $\omega_1, \omega_2, \ldots, \omega_k$ as $\{\omega_k\}$; according to the position of the AS center and the position and surface shape of M1, solving the starting point $o(\{\omega_k\})$ of the chief ray of $\{\omega_k\}$ on the xy plane; wherein the sizes of the light beam of the field of view $\{\omega_k\}$ in the x and y directions defines as $FEPD_X(\{\omega_k\})$ and $FEPD_Y(\{\omega_k\})$, according to $FEPD_X(\{\omega_k\})$, and $FEPD_Y(\{\omega_k\})$), the grid $G_{MN}$ is defined as $G_{MN,\{\omega k\}}=G_{MN}FEPD_X(\{\omega_k\})\times\cos\omega_k, FEPD_Y(\{\omega_k\}))$ on the plane xy; moving the grid center to $o(\{\omega_k\})$, to get a series of new grid points $G_{mn}(\{\omega_k\})+o(\{\omega_k\})$; taking the moved grid point as the starting point, and defining a series of characteristic light rays of the field of view as $FLR(\{\omega_k\})$, wherein directions of the characteristic light rays are the same as the propagation directions of the light in the field of view $\{\Psi_k\}$;

S7, defining grid $G_{MN, AS}=G_{MN}(D_{AS}, D_{AS})$ in the AS, wherein the characteristic light ray $FLR(\{\Psi_k\})$ from the grid point $G_{MN}(\{\omega_k\})+o(\{\omega_k\})$ intersects with AS at the grid points corresponding to $G_{MN, AS}$; according to the mapping relationship between grid point $G_{MN}(\{\subseteq_k\})+o(\{\omega_k\})$ and $G_{MN, AS}$ and based on $FLR(\{\omega_k\})$, solving the coordinates and normal directions of the FDP on M1 in the unobstructed system, and getting the surface shape equation of M1 by fitting;

S8, defining grid $G_{M'N',\{\Psi k\}}=G_{M'N'}(FEPD_X(\{\omega_k\})\times\cos\{\omega_k\}, FEPD_Y(\{\omega_k\}))$ on the xy plane, wherein M'>M, N'>N; and using the grid point $G_{m'n',\{\omega k\}}+o(\{\omega_k\})$ as the starting point, to define the new characteristic light $FLR'(\{\omega_k\})$, S9, according to the formula $H_k=\int_0^{\omega_k} FFL_x(\omega)d\omega$ and an integral of the FFL to the field angle that is in a range from 0 to $\{\omega_k\}$, obtaining the image height $H_k$ of the field of view $\{\omega k\}$ on the image surface, thereby obtaining the image point coordinates $IMG((\{\subseteq_k\})$ of the field of view;

S10, according to the object-image relationship of the unobstructed system, $FLR'(\{\omega_k\})$ intersects with the image surface at $IMG(\{\omega_k\})$ after being deflected by M1, M2 and M3; according to the mapping relationship between FLR' $(\{\omega_k\})$ and $IMG(\{\omega_k\})$, and based on $FLT'(\{\omega_k\})$, solving the coordinates and normal directions of FDP on M3 in the unobstructed system, to obtain the surface shape equation of M3 by fitting;

S11, according to the mapping relationship between FLR' $(\{\omega_k\})$ and $IMG(\{\omega_k\})$ in the step S10, and based on $FLR'(\{\omega_k\})$, solving the coordinates and normal directions of FDP on M2 in the unobstructed system, to obtain the surface shape equation of M2 by fitting;

S12, according to the new surface shape equation of M2, obtaining the position and direction of a new AS; and S13, letting k=k+1, and repeating the steps S6 to S12 until k=K.

During step S1, the change range of the FFL and FEPD of the target system is as shown in Table 1, and the target system is the imaging optical system 100.

Figure 12:
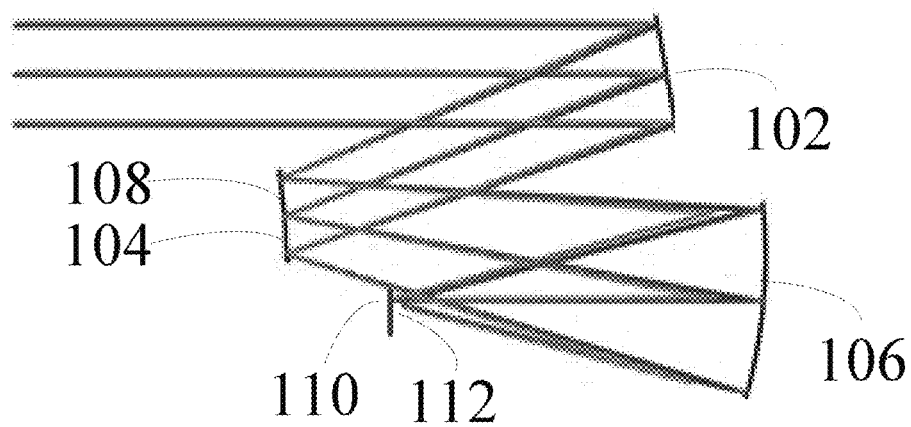
FIG. 12 shows a schematic side view of an optical path of an unobstructed spherical initial system in the second embodiment.

During step S2, the "three-reflecting mirror coaxial spherical system" refers to a coaxial spherical system composed of a primary mirror, a secondary mirror, and a tertiary mirror. The unobstructed system can be the unobstructed spherical initial system 300, as shown in FIG. 12. The surface of M1, the surface of the second spherical mirror can be named as a second spherical mirror surface defined as M2, and the surface of the third spherical mirror can be named as a third spherical mirror surface defined as M3.

During step S3, since the unobstructed system is symmetrical in the x direction, $\omega_k$ only needs to satisfy $0\leq\omega k\leq 20°$, wherein $\omega_1=0°$, $\omega_k=20°$.

During the step S4, when $d_x=d_y$, $G_{MN}$ is a circular radial grid.

During step S7, the mapping relationship between the grid point $G_{MN}(\{\omega_k\})+o(\{\omega_k\})$ and $G_{MN, AS}$ is "the characteristic light $FLR(\{\omega_k\})$ that is from the grid point $G_{MN}(\{_k\}+o(\{\omega_k\}))$ intersects with AS at the grid points corresponding to $G_{MN,AS}$".

During step S8, M'>M, N'>N, indicating that $G_{M'N',\{\omega k\}}$ is a denser grid than $G_{MN,\{\omega k\}}$.

During step S10, the mapping relationship between FLR' $(\{\omega_k\})$ and $IMG(\{\omega_k\})$ is that "$FLR'(\{\omega_k\})$ intersects with the image surface at $IMG(\{\omega_k\})$ after being deflected by M1, M2 and M3".

During step S12, since the AS is located at M2, the position and direction of new AS are obtained according to the surface shape equation of the new M2.

During steps S7, S10 and S11, the method of obtaining the surface shape equations of M1, M2 or M3 by fitting is not limited. In one embodiment, the method for obtaining the surface shape equations of M1, M2 or M3 by fitting includes the following sub-steps:

Step S1', establishing an initial curved surface and a first three-dimensional rectangular coordinate system;

Step S2', selecting K characteristic light rays $R_i$ (i=1, 2, ... , K);

Step S3', according to the object-image relationship (or light mapping relationship) and Snell's law, point by point solving the multiple intersections of each characteristic light ray and the freeform surface to be solved, to obtain multiple characteristic data points $P_i$ (i=1, 2, . . . , K);

Step S4', in the first rectangular coordinate system, fitting the multiple characteristic data points into a spherical surface, and defining the characteristic data points corresponding to the chief ray of the field the center sampling -view as the vertex of the spherical surface; and taking the vertex of the spherical surface as the origin, and the straight line passing through the center of curvature and the vertex of the spherical surface is the z axis, to establish a second three-dimensional rectangular coordinate system; and Step S5', transforming the coordinates $(x_i, y_i, z_i)$ and normal vectors $(\alpha_i, \beta_i, \gamma_i)$ of the multiple characteristic data points in the first three-dimensional rectangular coordinate system into coordinates $(x'_i, z'_i, z'_i)$ and normal vectors $(\alpha'_i, \beta'_i, \gamma'_i)$ in the second three-dimensional rectangular coordinate system, and fitting the multiple characteristic data points $P_i$ (i=1, 2, . . . K) in the second three-dimensional rectangular coordinate system to form a quadric surface; removing the coordinates and normal vectors of the characteristic data points on the quadric surface in the second three-dimensional rectangular coordinate system respectively from the coordinates $(x'_i, y'_i, z'_i)$ and normal vectors $(a'_i, \beta'_i, \gamma'_i)$, to obtain residual coordinates and residual normal vectors, and surface fitting the residual coordinates and residual normal vectors, to obtain a freeform surface; wherein the equation of the freeform surface is added to the equation of the quadric surface, to obtain the equation of the freeform surface to be solved, so that the surface shape equation of M1, M2, or M3 is obtained.

Figure 7:
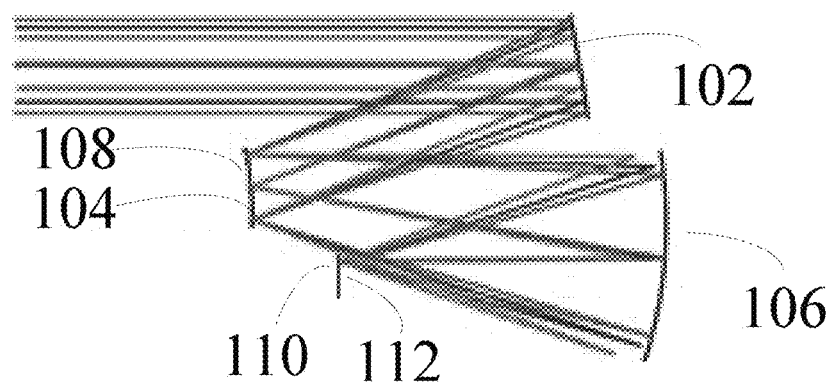
FIG. 7 shows a schematic side view of an optical path of an initial system of the second embodiment.
Figure 8:
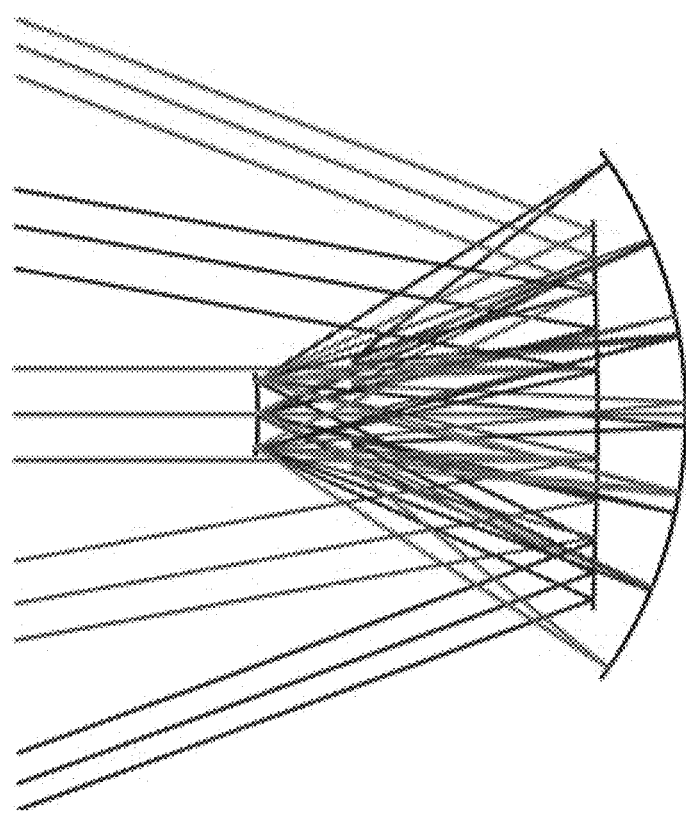
FIG. 8 shows a schematic top view of the optical path of the initial system of the second embodiment.
Figure 9:
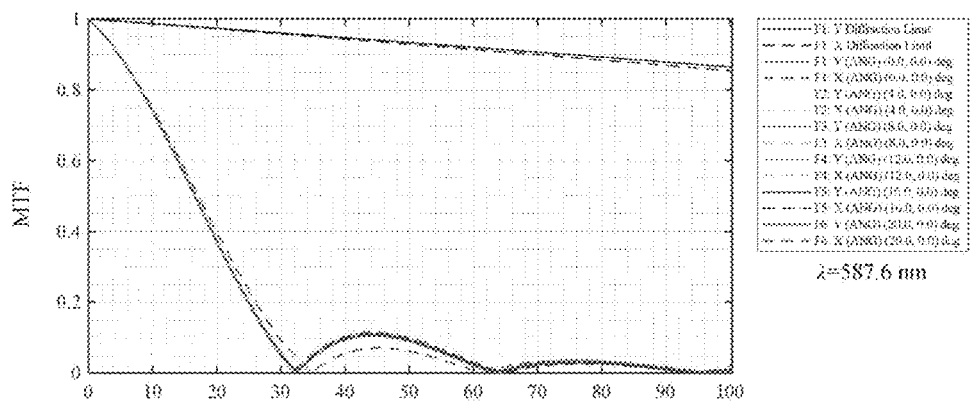
FIG. 9 shows a MTF curve of the initial system of the second embodiment.

According to the steps S1 to S13, the initial system 200 of the imaging optical system 100 can be obtained. In the imaging optical system 100, the beam aperture of each field of view $\omega_k$ (k=1, . . ., K) satisfies the FEPD design requirements, and at the same time the image height on the image surface satisfies the FFL design requirements. The initial system 200 is shown in FIGS. 7 and 8. The initial system 200 includes three reflecting mirrors: the primary reflecting mirror 102, the secondary reflecting mirror 104, and the tertiary reflecting mirror 106. The three reflecting mirrors of the initial system 200 are freeform surfaces, and the freeform surfaces are described by an XY polynomial with the highest order of 4th. The imaging quality of the initial system 200 is relatively poor, as shown in FIG. 9.

Figure 10:
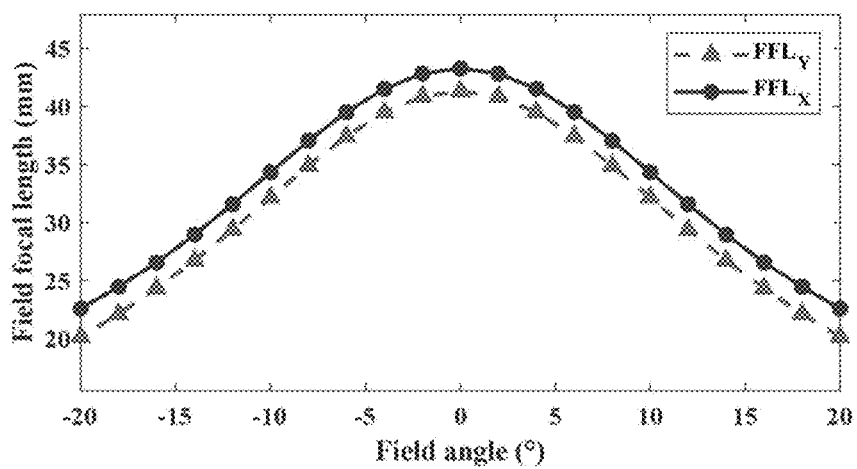
FIG. 10 shows a curve of a EEL of the initial system varied with the field of view of the second embodiment.

After calculating, the FFL, FEPD and FFN data of the initial system 200 are shown in Table 4. The FFL value of each field of view varies with the field of view, as shown in FIG. 10. The value of FEPD of each field of view varies with the field of view, as shown in FIG. 11.

TABLE 4

| Parameters of the initial system 200 | | | | | | |
|---|---|---|---|---|---|---|
| Field of view (°) | 0 | 4 | 8 | 12 | 16 | 20 |
| $FFL_X$ (mm) | 43.29 | 41.53 | 37.06 | 31.61 | 26.58 | 22.57 |
| $FEPD_X$ (mm) | 20.02 | 19.50 | 18.07 | 16.06 | 13.85 | 11.75 |
| $FFN_X$ | 2.16 | 2.13 | 2.05 | 1.97 | 1.92 | 1.92 |
| $FFL_Y$ (mm) | 41.33 | 39.50 | 34.91 | 29.40 | 24.31 | 20.14 |
| $FEPD_Y$ (mm) | 21.01 | 20.12 | 18.00 | 15.54 | 13.29 | 11.41 |
| $FFN_Y$ | 1.97 | 1.96 | 1.94 | 1.89 | 1.83 | 1.76 |

Figure 11:
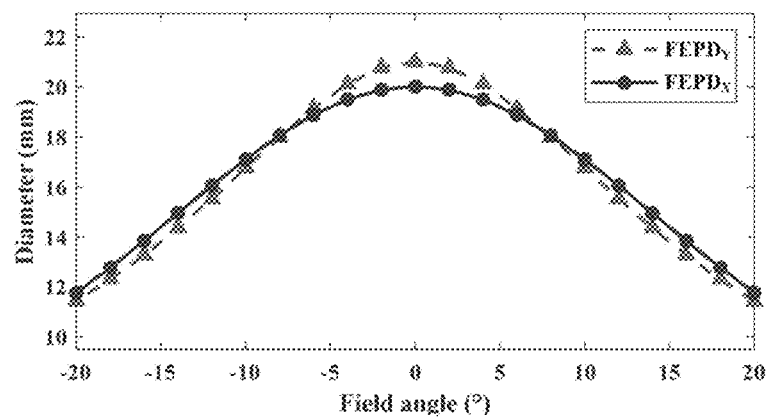
FIG. 11 shows a curve of a FEPD of the initial system varied with the field of view of the second embodiment.

It can be seen from Table 4, FIG. 10 and FIG. 11 that the FFL and FEPD of each field of view are all close to the parameters of the imaging optical system 100, and the parameters of the imaging optical system 100 are the parameters expected by the design. Therefore, the initial system 200 can be used as a good initial solution for subsequent optimization. After optimization and improvement of the imaging quality of the initial system 200, the design of the imaging optical system 100 (target system) is completed.

The design method of the imaging optical system 100 can further include a step S14 of "optimizing the initial system 200 to improve the imaging quality of the initial system 200" after the step S13. In the step S14, the method for optimizing the initial system 200 so as to improve the imaging quality of the initial system 200 is not limited, and can be implemented by using optical design software. The optical design software includes CODE V or ZEMAX OPTIC STUDIO and so on.

After the step S14, the method for designing the imaging optical system 100 further includes a step of processing according to the parameters of the imaging system that satisfy the design requirements output in the step S14, thereby obtaining a physical element of the imaging optical system 100.

Furthermore, the method for designing the imaging optical system 100 includes a step of processing according to the parameters of the initial system 200 output in the step S13 after the step S13, so as to obtain a physical element of the initial system 200, The following is a specific embodiment of the design method of the imaging optical system 100.

The value of $FFL_x$ in the target system (the imaging optical system 100) is in a range from 20 mm to 40 mm, and the function of the $FFL_X$ is $FFL_X(\omega_x)=40-20\times(\omega_x/0.349)^2$, wherein the unit of angle $\omega_x$ is radian.

The value of $FEPD_{x, y}$ in the target system (the imaging optical system 100) is in a range from 10 mm to 20 mm. and the value of $FFN_x$ in each field of view is 2, thus the function of $FEPD_x$ is $FEPD_X(\omega_x)=40-20\times(\omega_x/0.349)^2$.

Figure 13:
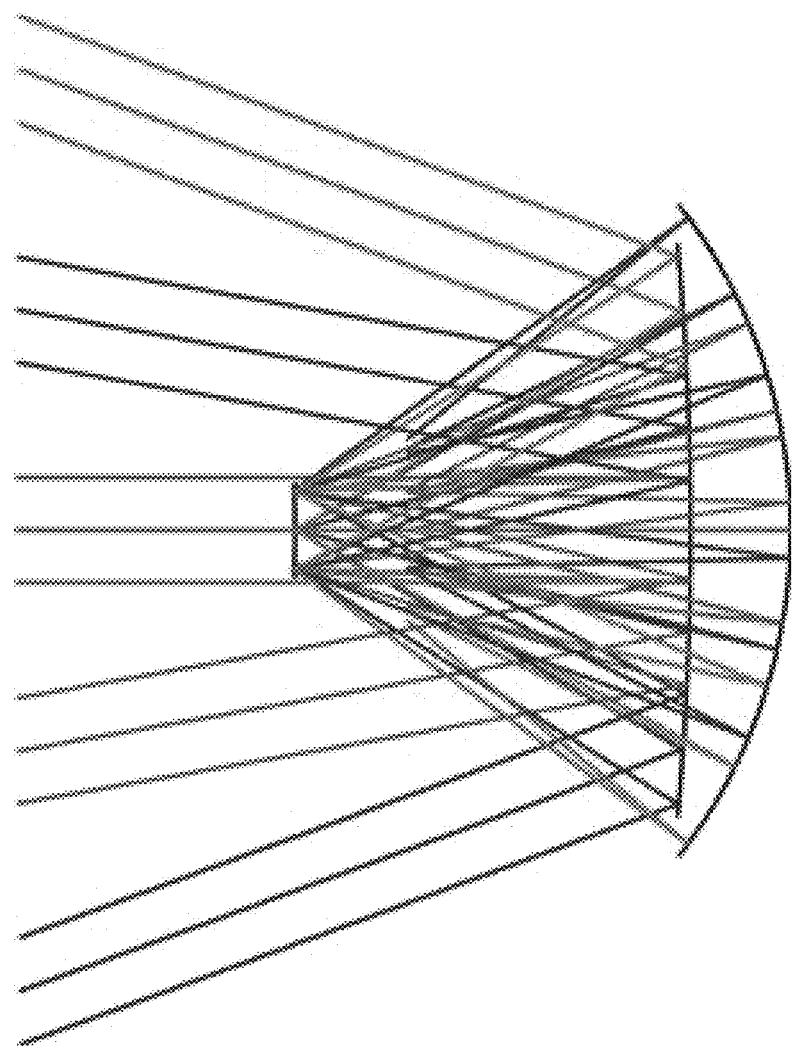
FIG. 13 shows a schematic top view of the optical path of the unobstructed spherical initial system in the second embodiment.

The selected unobstructed spherical initial system 300 is shown in FIG. 12 and FIG. 13, and $D_{AS}$ of the unobstructed spherical initial system 300 is 14.67 mm.

Figure 14:
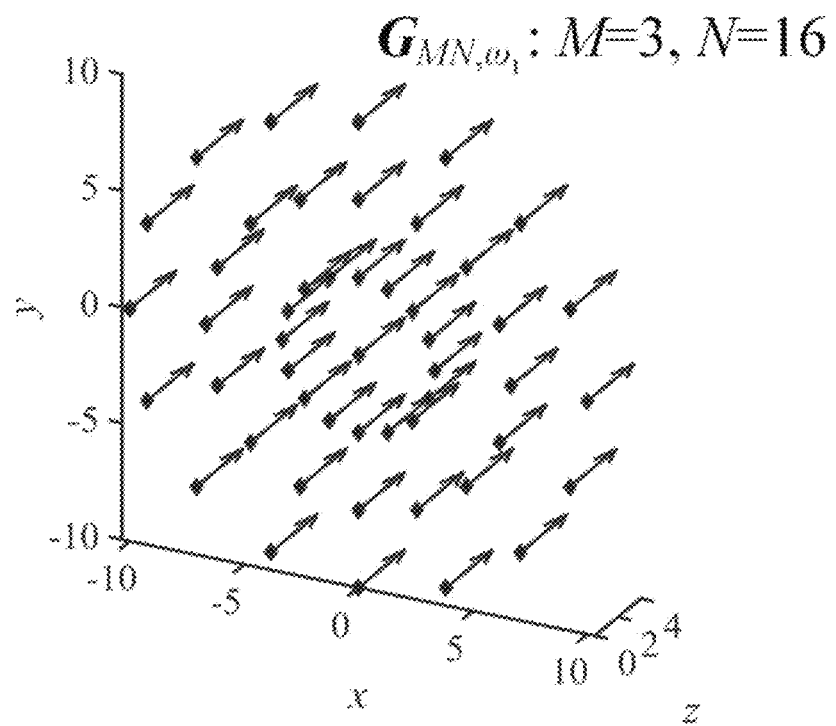
FIG. 14 shows characteristic light rays FLR ($\omega_1$) of a field of view $\omega_1$ used to calculate a M1 surface shape equation of the second embodiment.
Figure 15:
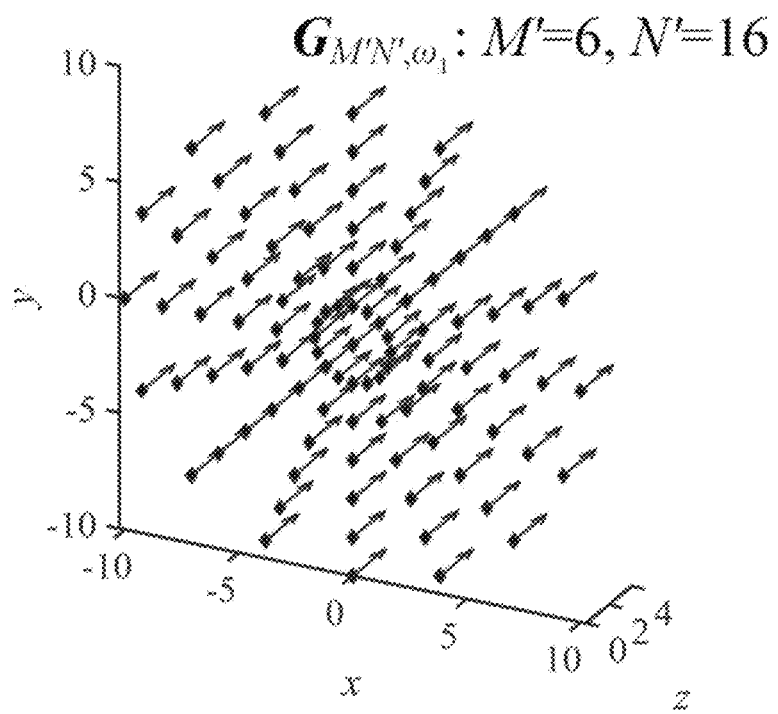
FIG. 15 shows characteristic light rays FLR' ($\omega_1$) of the field of view $\omega_1$ used to calculate a M2 surface shape equation and a M3 surface shape equation of the second embodiment.
Figure 16:
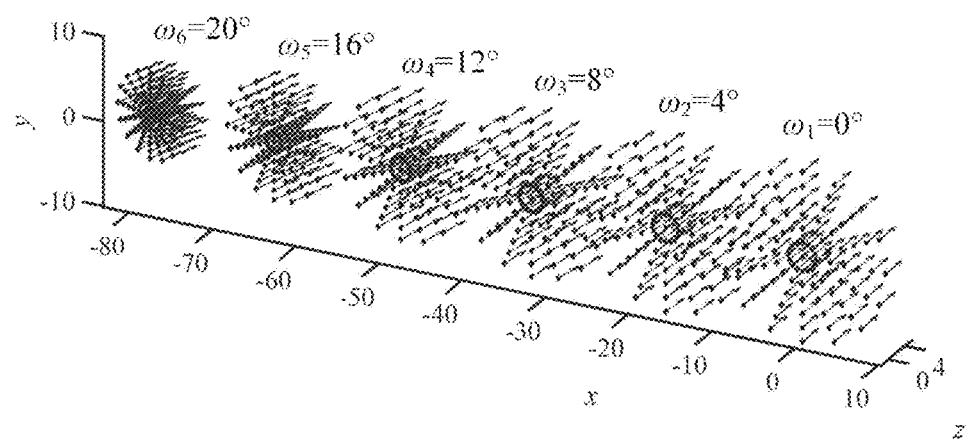
FIG. 16 shows a characteristic light ray FLR' ($\{(107_k\}$, k=1, . . . , 6) of each field of view used to calculate the M2 surface shape equation and the M3 surface shape equation of the second embodiment.

Because the unobstructed spherical initial system 300 is symmetrical in the x direction, it is sufficient to take the characteristic field of view within the half field of view. Six fields of view $\omega_k$ (k=1, . . . , 6) are selected as the characteristic field of view for subsequent surface shape calculation, and the angular interval of each field of view is 4°. When calculating the FDP and surface shape of M1, the grid is $G_{MN,\{\omega\}}$. wherein M=3, N=16. FIG. 14 shows the FLR incident to M1 in the field of view $\omega_1$ obtained from the grid. When calculating the FDPs and surface shapes of M2 and M3, the grid is $G_{M'N',\{\omega k\}}$, wherein M'=6, N'=16. FIG. 15 shows FLR incident to the optical system in the field of view $\omega_1$ obtained from the grid. The resulting incident characteristic light rays of each field of view are shown in FIG. 16. It can be seen from FIG. 16 that the light beam diameter of the central field of view is thicker, while the light beam diameter of the edge field of view is thinner, and the light beam diameter of the central field of view is twice that of the edge field of view.

According to the formulas $FFL_X(\omega_x)=40-20\times(\omega_x/0.349)^2$ and $H_k=\int_0^{\omega_k} FFL_X(\omega)d\omega$, the image height on the image surface corresponding to each field of view can be obtained, as shown in Table 5.

TABLE 5

The image height of each field of view obtained by integration of FFL to the field of view

| Field of view (°) | 0 | 4 | 8 | 12 | 16 | 20 |
|---|---|---|---|---|---|---|
| Image height (mm) | 0 | 2.77 | 5.44 | 7.87 | 9.98 | 11.64 |

After the calculations from the step S5 to the step S13, the initial system 200 is finally Obtained. In the initial system 200, AS is located at M2, and the diameter of AS is $D_{AS}$=14.67 mm. The three reflecting minors in the initial system 200 are freeform surfaces, and the surface shape is described by an XY polynomial with the highest order of 4th.

The initial system 200 serves as a good initial solution for subsequent optimization. In the subsequent optimization process, while maintaining the local optical characteristics as much as possible, the imaging quality of the initial system 200 is improved to a sufficiently high level.

The setting of variable constraints in the optimization process is as follows: (1) constraining upper rays, lower rays, left rays, and right rays of each field of view to the edge points corresponding to AS; (2) controlling the image height of the image surface of each field of view, wherein the image height directly affects the $FFL_X$ value of each field of view; (3) controlling the $FEPD_X$ and $FEPD_Y$ of each field of view; and (4) adding a small field of view of 0.1° and controlling the parameter $FFL_Y$ in the Y direction.

After optimization, the imaging optical system 100 is obtained. The imaging optical system 100 has specific FFL and FEPD. The definitions and characteristics of FFL and FEPD have been described above and will not be repeated here.

The method for designing the imaging optical system 100 has the following advantages: first, the initial system 200 can be used as a good initial solution for subsequent optimization; after optimization and improvement of the imaging quality of the initial system 200, the design of the imaging optical system 100 (target system) is completed; second, the method is simple.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Additionally, it is also to be understood that the above description and the claims drawn to a method may comprise some indication in reference to certain steps. However, the indication used is only to be viewed for identification purposes and not as a suggestion as to an order for the steps.

What is claimed is:

1. A method for designing an imaging optical system, comprising:

S1, defining a focal length of a field of view as FFL and an effective aperture of a field of view entrance pupil as FEPD, and providing functions $FFL_X(\omega)$, $FEPD_X(\omega)$ and $FEPD_Y(\omega)$ of the FFL and the FEPD according to the FFL and the FEPD of a target system, wherein the FFL and the FEPD change with the field of view, $\omega=\omega_x$, and $\omega_y=0$;

S2, considering no obstruction, constructing a three-reflecting mirror coaxial spherical system with a first-order focal length equal to $FFL_X(0)$ and comprising a primary mirror, a secondary mirror and a tertiary mirror; and then adjusting positions and inclination angles of the primary minor, the secondary mirror, and the tertiary mirror, to eliminate the obstruction and obtain an unobstructed system; wherein an aperture stop, defined as AS, is located on the secondary mirror, a diameter of the aperture stop is defined as $D_{AS}$, and the $D_{AS}$ is calculated according to $FEPD_X(0)$ and $FEPD_Y(0)$; the unobstructed system comprises a first spherical mirror surface defined as M1, a second spherical mirror surface defined as M2, and a third spherical mirror surface defined as M3; and the diameter of the aperture stop in the unobstructed system is equal to $D_{AS}$ and coincides with the M2;

S3, taking a series of field angles $\omega_k$ (k=1, ..., K) as characteristic fields of view;

S4, defining a radial grid $G_{MN}(d_x, d_y)$ on a xy plane, wherein M and N are integers, the radial grid $G_{MN}(d_x, d_y)$ comprises a plurality of grid points: coordinates of the plurality of grid points are $G_{mn}(d_x, d_y)=(d_x/2)\rho_m\cos\theta_n x+(d_y/2)\rho_m\sin\theta_n y$; $\rho_m=m/M$, and m=0, 1, ..., M; and $\theta_n=n\times360°/N$, and n=0, 1, ..., N-1;

S5, letting k=1;

S6, taking k fields of view of $\omega_1, \omega_2, ..., \omega_k$ as research object to be denoted as $\{\omega_k\}$; according to a position of a center of the aperture stop, and a position and a surface shape of the M1, solving a starting point $o(\{\omega_k\})$ of a chief ray of the $\{\omega_k\}$ on the xy plane; defining a grid $G_{MN, \{\omega k\}}=G_{MN}(FEPD_X(\{\omega_k\})\times\cos\omega_k, FEPD_Y(\{\omega_k\}))$ on the xy plane according to $FEPD_X(\{\omega_k\})$ and $FEPD_Y(\{\omega_k\})$; moving a center of the grid to the $o(\{\omega_k\})$; to get a series of moved grid points $G_{mn}(\{\omega_k\})+o(\{\omega_k\})$; and taking moved grid point as the starting point, and defining a series of characteristic light rays of the field of view as $FLR(\{\omega_k\})$; wherein light beams of a field of view $\{\omega_k\}$ in the x and y directions are defined as the $FEPD_X(\{\omega_k\})$ and the $FEPD_Y(\{\omega_k\})$, and directions of the characteristic light rays are the same as propagation directions of light rays in the field of view $\{\omega k\}$;

S7, defining a grid $GA_{MN, AS}=G_{MN}(D_{AS}, D_{AS})$ in the aperture stop, solving coordinates and normal directions of characteristic data points on the M1 in the unobstructed system according to a mapping relationship between a grid point $G_{MN}(\{\omega_k\})+o(\{\omega_k\})$ and the $G_{MN, AS}$, and based on $FLR(\{\omega_k\})$; and getting a surface shape equation of M1 by fitting; wherein the characteristic light ray $FLR(\{\omega_k\})$ from the grid point $G_{MN}(\{\omega_k\})+o(\{\omega w_k\})$ intersects with the aperture stop at the grid points corresponding to $G_{MN, AS}$;

S8, defining a grid $G_{M'N',\{\omega k\}}=G_{M'N'}(FEPD_X(\{\omega_k\})\times\cos\{\omega_k\}, FEPD_Y(\{\omega_k\}))$ on the xy plane, and using the grid point $G_{m'n',\{\omega k\}}+o(\{\omega_k\})$ as the starting point to define a new characteristic light $FLR'(\{\omega_k\})$, wherein M'>M, N'>N;

S9, obtaining an image height $H_k$ of the field of view $\{\omega_k\}$ on an image surface according to a formula $H_k=\int_0^{\omega_k} FFL_x(\omega)d\omega$ and an integral of the FFL to the field angle that is in a range from 0 degrees to $\{\omega_k\}$ degrees, thereby obtaining image point coordinates $IMG(\{\omega_k\})$ of the field of view;

S10, according to an object-image relationship of the unobstructed system, intersecting $FLR'(\{\omega_k\})$ with the image surface at $IMG(\{_k\})$ after being deflected by the M1, the M2 and the M3; according to a mapping relationship between $FLR'(\{\omega_k\})$ and $IMG(\{\omega_k\})$, and based on $FLR'(\{\omega_k\})$, solving coordinates and normal directions of FDP on the M3 in the unobstructed system, to obtain a surface shape equation of the M3 by fitting;

S11, according to the mapping relationship between $FLR'(\{\omega_k\})$ and $IMG(\{\omega_k\})$ in the step S10, and based on $FLR'(\{\omega_k\})$, solving coordinates and normal directions of FDP on the M2 in the unobstructed system, to obtain a surface shape equation of the M2 by fitting;

S12, according to the surface shape equation of the M2 in the step S11, obtaining a position and a direction of a new aperture stop; and S13, letting k=k+1, and repeating the steps S6 to S12 until k=K.

2. The method of claim 1, wherein the $FFL_X$ of the target system is in a range from 20 mm to 40 mm, and the function of the $FFL_X$ is $FFL_X(\omega_X)=40-20\times(\omega/0.349)^2$, wherein a unit of an angle $\omega_x$ is radian.

3. The method of claim 1, wherein the $EEPD_{X,Y}$ of the target system is in a range from 10 mm to 20 mm, and the $FFN_X$ of each field of view is 2, the function of the $FEPD_X$ is $FEPD_X(\omega_x)=40-10\times(\omega_x/0.349)^2$.

4. The method of claim 1, wherein an initial system of the target system is obtained by performing the step S1 to the step S13, and the diameter of the aperture stop in the initial system is 14.67 mm.

5. The method of claim 4, wherein the initial system comprises three reflecting mirrors, each reflecting mirror has a freeform surface, and the freeform surface is described by an XY polynomial with the highest order of 4th.

6. The method of claim 4, further comprising a step of optimizing the initial system to improve an imaging quality of the initial system after the step S13.

7. The method of claim 6, further comprising a step of processing after the step S14, so that a physical element of an imaging optical system is obtained.

8. The method of claim 7, wherein the imaging optical system comprises a primary reflecting minor, a secondary reflecting mirror, a tertiary reflecting mirror, and an aperture stop; and the aperture stop is located on the secondary reflecting mirror.

9. The method of claim 8, wherein the FFL and the FEPD at a central field of view are greater than that of the edge field of views, and the FFL and the FEPD change continuously.

10. The method of claim 8, wherein the primary reflecting mirror, the secondary reflecting mirror, and the tertiary reflecting mirror are freeform surface reflecting mirrors, and the imaging optical system is a freeform surface off-axis three-reflecting mirror optical system.

\* \* \* \* \*